United States Patent
Dhawan et al.

(10) Patent No.: US 11,945,638 B2
(45) Date of Patent: *Apr. 2, 2024

(54) PACKAGED FOOD PRODUCT FOR SOLID STATE MICROWAVE OVEN

(71) Applicant: SOCIÉTÉ DES PRODUITS NESTLÉ S.A., Vevey (CH)

(72) Inventors: Sumeet Dhawan, Twinsburg, OH (US); Ulrich Johannes Erle, Cleveland, OH (US); Erich Heinze, Streetsboro, OH (US)

(73) Assignee: Societe des Produits Nestle S.A., Vevey (CH)

( * ) Notice: Subject to any disclaimer, the term of this patent is extended or adjusted under 35 U.S.C. 154(b) by 717 days.

This patent is subject to a terminal disclaimer.

(21) Appl. No.: 15/779,572

(22) PCT Filed: Oct. 11, 2016

(86) PCT No.: PCT/EP2016/074272
§ 371 (c)(1),
(2) Date: May 29, 2018

(87) PCT Pub. No.: WO2017/092913
PCT Pub. Date: Jun. 8, 2017

(65) Prior Publication Data
US 2020/0299051 A1    Sep. 24, 2020

Related U.S. Application Data

(60) Provisional application No. 62/261,971, filed on Dec. 2, 2015.

(51) Int. Cl.
*H05B 6/64* (2006.01)
*A23L 5/10* (2016.01)
(Continued)

(52) U.S. Cl.
CPC ............ *B65D 81/3453* (2013.01); *A23L 5/15* (2016.08); *B65D 1/36* (2013.01); *H05B 6/64* (2013.01);
(Continued)

(58) Field of Classification Search
CPC ......... A23L 5/15; A23V 2002/00; B65D 1/36; B65D 2581/3427; B65D 2581/3447; B65D 2581/3498; B65D 81/3453
(Continued)

(56) References Cited

U.S. PATENT DOCUMENTS 3,302,632 A * 2/1967 Fichtner ............. B65D 81/3453
219/728
4,190,757 A * 2/1980 Turpin ............... B65D 81/3446
219/729
(Continued)

FOREIGN PATENT DOCUMENTS

WO    2006128156    11/2006
WO    2008014377    1/2008

*Primary Examiner* — Quang T Van
(74) *Attorney, Agent, or Firm* — K&L Gates LLP (57) ABSTRACT

A packaged food product is configured for being heated in a solid state microwave oven and a method heats a food in a solid state microwave oven. Particularly, the packaged food product includes a food, a tray and a susceptor, and a thermal insulation is positioned between the susceptor and the food.

13 Claims, 4 Drawing Sheets

(51) Int. Cl.
  *B65D 1/36*  (2006.01)
  *B65D 81/34*  (2006.01)
  *H05B 6/68*  (2006.01)

(52) U.S. Cl.
  CPC ........ *H05B 6/6408* (2013.01); *A23V 2002/00* (2013.01); *B65D 2581/3427* (2013.01); *B65D 2581/3447* (2013.01); *B65D 2581/3498* (2013.01)

(58) Field of Classification Search
  USPC ....... 219/725, 728, 730, 732, 733, 734, 759; 426/107, 241, 243, 242, 62, 126, 127, 426/106, 531, 92, 100, 114, 11, 8, 641; 99/DIG. 14, 422
  See application file for complete search history.

(56) References Cited

U.S. PATENT DOCUMENTS

| | | |
|---|---|---|
| 2007/0251942 A1 | 11/2007 | Cole et al. |
| 2009/0208614 A1* | 8/2009 | Sharma .............. B65D 81/3453 426/243 |
| 2009/0236335 A1 | 9/2009 | Ben-Shmuel et al. |
| 2011/0204046 A1 | 8/2011 | Middleton et al. |
| 2017/0059172 A1* | 3/2017 | Johnson ............... H05B 1/0263 |

\* cited by examiner

PACKAGED FOOD PRODUCT FOR SOLID STATE MICROWAVE OVEN

CROSS REFERENCE TO RELATED APPLICATIONS

The present application is a National Stage of International Application No. PCT/EP2016/074272, filed on Oct. 11, 2016, which claims priority to U.S. Provisional Patent Application No. 62/261,971, filed on Dec. 2, 2015, the entire contents of which are being incorporated herein by reference.

The present invention relates to a packaged food product for being heated in a solid state microwave oven and a method for heating a food in a solid state microwave oven.

Household microwave ovens are very common appliances with more than 90% household penetration in the US and comparable numbers in other industrialized countries. Besides the re-heating of leftovers, the preparation of frozen meals and snacks is considered to be the most important use of microwave ovens in the US. The main benefit of microwave ovens is their speed, which is a result of the penetration of the electromagnetic waves into the food products. Although this heating mechanism is sometimes called 'volumetric heating', it is important to know that the heating pattern is not very even throughout the volume of the food. In fact, there are several aspects of today's household microwave ovens and their interaction with food that can lead to unsatisfactory results: The vast majority of household microwave ovens have a magnetron as microwave source, because this device is inexpensive and delivers enough power for quick heating. However, the frequency of microwaves from magnetrons is not controlled precisely and may vary between 2.4 and 2.5 GHz (for most household ovens). Consequently, the pattern of high and low intensity areas in the oven cavity is generally unknown and may even vary during the heating process.

Solid State Microwave Technology is a new technology and offers several advantages over magnetron-based technology. The main difference lies in the precise control of the frequency, which is a result of the semiconductor-type frequency generator in combination with the solid state amplifier. The frequency is directly related to the heating pattern in the cavity, so a precise frequency control leads to a well-defined heating pattern. In addition, the architecture of a solid state system makes it relatively easy to measure the percentage of microwaves that are being reflected back to the launchers. This feature is useful for scanning the cavity with a frequency sweep and determining which frequency, i.e. pattern, leads to more absorption by the food and which is less absorbed. Multi-channel solid state systems offer additional flexibility in that the various sources can be operated at the same frequency, with the option of user-defined phase angles, or at different frequencies. The solid state microwave technology is further described for example in: P. Korpas et al., Application study of new solid-state high-power microwave sources for efficient improvement of commercial domestic ovens, IMPI's 47 Microwave Power, Symposium; and in R. Wesson, NXP RF Solid State cooking White Paper, NXP Semiconductors N.V., No. 9397 750 17647 (2015). Examples of such solid state microwave ovens are described in US2012/0,097,667 (A1) and in US2013/0,056,460(A1).

Microwave susceptors are materials that show a strong absorption of microwaves. Typically, the word 'susceptor' in the context of food products refers to a laminated packaging material with a thin layer of aluminum embedded between a polyester and a paper layer. The purpose of susceptors is to heat up to temperatures up to 220° C. in the microwave oven and to impart browning and crisping to the food surface. This concept requires a good contact between the susceptor and the food surface for sufficient heat transfer. Without an intense heat transfer, susceptors lose their intended functionality, which is why susceptors are commonly applied with the active layer facing the food. In this configuration there is typically only a 12 micron polyester layer between the aluminum layer that generates the heat and the food product. Frozen prepared meals often come in multi-compartment trays. The food components or items in the various compartments are usually very different in nature and therefore have different requirements of heating. A common problem is that the amount of energy supplied to each of the compartments does not meet the culinary requirements of the food therein. For instance, the meat component of a meal typically requires more energy than the vegetable component. Since all components need to reach a safe temperature, the vegetable portion is often overcooked. There is therefore a clear and persisting need to provide a solution for a more targeted heating effect for the different food items of a prepared meal and/or compartments of food trays comprising those food items, respectively.

SUMMARY OF THE INVENTION

The object of the present invention is to improve the state of the art and to provide an improved solution to packaged food products to overcome at least some of the inconveniences described above. Particularly, the object of the present invention is to provide a packaged food product designed for being heated in a solid state microwave oven, where at least two different food items can be heated simultaneously, but each to a different final temperature. A further object of the present invention is to provide a solution to packaged food products where individual food items can be heated, respectively cooked, more regularly and in a controlled way. A still further object of the present invention is to provide a solution where two or more different food items can be heated simultaneously in one dish to achieve optimal cooking of each different food item at the same time at the end of the same heating period. Particularly, the object is to provide a solution where a meat product, such as a beef, chicken, lamb or pork product, can be cooked to perfection in a microwave oven at the same time as a vegetable product and/or a pasta, noodle, rice or potato product present in a same dish at the same time.

The object of the present invention is achieved by the subject matter of the independent claims. The dependent claims further develop the idea of the present invention.

Accordingly, the present invention provides in a first aspect a packaged food product for being heated in a solid state microwave oven, the packaged food product comprising a food, a tray and a susceptor, wherein the susceptor is integrated or attached to a bottom of the tray and covers a part of the surface of the bottom of said tray, characterized in that there is a thermal insulation between the susceptor and the food.

In a second aspect, the invention relates to a method for heating a food in a solid state microwave oven comprising the steps of placing the packaged food product according to the present invention into a solid state microwave oven and then heating the food or parts thereof at a selected frequency of between 900 and 5800 MHz.

It has been surprisingly found by the inventors that when they placed a susceptor underneath one compartment of a two compartment tray and used this to heat up the same amount of frozen mashed potatoes in each compartment in a solid state microwave oven, it was not the compartment with the susceptor which heated up most, but the compartment next to it without the susceptor. Further research then revealed that the susceptor absorbed a considerable amount of the energy from the solid state microwave oven. Thus, this shifted the balance of heating in favor of the side without the susceptor underneath the tray in a way that is different from a pure shielding effect. Consequently, when a susceptor is placed underneath a compartment in such a way that it cannot transfer heat energy directly to e.g. an adjacent food item, it will consume a part of the energy in its vicinity and heat up. And the heat, because of the thermal insulation, will essentially not be able to reach the adjacent compartment. Accordingly, the susceptor is not functioning to heat the food in the adjacent compartment through conduction. Hence, this observation can be used to design novel packaged food products for being used to heat up food items in a solid state microwave oven, where one or several susceptor(s) are placed in such way that they are thermally insulated, i.e. do not make use of the generated heat of the susceptor to heat up the food items. Instead, the novel packaged food product balances the heating in favor of the side without the insulated susceptor to very specifically target and heat up individual food items comprised in this packaged product. This allows now to design novel packaged foods comprising different food items in one dish or tray, which require for example different amounts of energy for being heated or cooked appropriately. The present invention now allows designing such novel packaged dishes which can be heated in a solid state microwave oven and where by the design of the tray in combination with the susceptor, individual different food items can be cooked all at the same time optimally and to perfection.

DETAILED DESCRIPTION OF THE INVENTION

The present invention pertains to a packaged food product for being heated in a solid state microwave oven, the packaged food product comprising a food, a tray and a susceptor, wherein the susceptor is integrated or attached to a bottom of the tray and covers a part of the surface of the bottom of said tray, characterized in that there is a thermal insulation between the susceptor and the food.

A "solid state microwave oven" is a microwave oven delivering solid state electromagnetic energy. Typically, production of such solid state energy is transistor-based and not magnetron produced.

A "susceptor" is a material used for its ability to absorb electromagnetic energy and to convert it to heat. Susceptors are usually made of metallized film or paper.

A "tray" is a shallow platform for carrying or holding things such as food items. For example trays are typically used for holding food items in the area of prepared dishes and frozen meals. Trays usually have a more or less flat bottom part which allows to stably placing the tray onto a surface e.g. for heating it in an oven or for putting it onto a table for ease of consumption.

"Thermal insulation" is the reduction of heat transfer between two objects of different temperatures which are in thermal contact or in range of thermal radiative influence.

In the packaged food product of the present invention, the thermal insulation can for example be provided by a layer of plastic material, paper material, paperboard, or a combination thereof. Thereby the plastic material can be selected for example from PP (polypropylene) or Polyethylene terephthalate (PET), or particularly from crystallized Polyethylene terephthalate (CPET), and combinations therefrom with paper material such as for example PET laminated paperboard.

Preferably, the layer of plastic material, paper material, paperboard or a combination thereof, is at least 0.20 mm thick, preferably at least 0.30 mm thick, more preferably at least 0.50 mm thick. These are preferred minimal thicknesses to assure an adequate thermal insulation between the susceptor and the closest food item in contact.

In an embodiment, the tray of the packaged food product of the present invention is not thicker than 2 mm, preferably not thicker than 1.75 mm, more preferably not thicker than 1.50 mm. The tray is preferably designed for a single use application. Therefore, the tray should be thick enough to support the amount and weight of the food items to be placed therein, and to support a certain handling of the tray by the consumer such as placing it into a microwave oven, carrying it around and using it as a tray for directly eating from the package. Furthermore, the tray should not be too thick as to be not too heavy by itself, and not to require more packaging material as absolutely necessary in order to reduce production costs and environmental impact, particularly when the tray is used only once and discarded thereafter.

In a preferred embodiment, the thermal insulation of the packaged food product has a thermal resistance value R of at least 0.0004 $m^2K/W$, preferably of at least 0.001 $m^2K/W$, more preferably of at least 0.005 $m^2K/W$, even more preferably of at least 0.01 $m^2K/W$. R stands for thermal resistance value R. R is measured in $m^2K/W$, wherein K stands for Kelvin and W for Watt. Thermal conductivity (k-value) is the ability of a material to conduct heat and it is measured in W/mK. Consequently, the value R is determined by assessing the k-value of an insulating material and measuring its thickness L as follows: R=L/k. Table I provides some k-values for materials typically used for making packaging trays.

TABLE I

| Material | k = W/mK at ca. 25° C. |
| --- | --- |
| Aluminum | 205 |
| Cellulose | 0.23 |
| Celluloid | 0.12-0.21 |

TABLE I-continued

| Material | k = W/mK at ca. 25° C. |
|---|---|
| Cork board | 0.043 |
| Crystallized PET (CPET) | 0.15-0.4 |
| Fiberglass | 0.04 |
| Nylon | 0.25 |
| Paper | 0.05 |
| Polycarbonate | 0.19 |
| Polyester | 0.05 |
| Polyethylene | 0.33-0.51 |
| Polypropylene (PP) | 0.1-0.22 |
| Polytetrafluorethylene (PTFE) | 0.25 |
| Polyvinylchloride (PVC) | 0.19 |
| Vinyl ester | 0.25 |

In one embodiment of the present invention, the part covered by the susceptor of the packaged food product is up to 50% of the surface of the bottom of the tray. Preferably, the part covered by the susceptor is up to 40% of the surface of the bottom of the tray. Typically however, the part covered by the susceptor is at least 20% of the surface of the bottom of the tray.

In one embodiment of the present invention, the tray of the packaged food product is a two-compartment tray or a multi-compartment tray. A multi-compartment tray may have three, four, five or even more compartments in one tray. One of the advantages to using a two- or multi-compartment tray is that it allows to easily separate individual different food items from each other. In this way and in combination with a use and design of one or more specific susceptor(s), the bundled energy of a solid state microwave application can be very clearly and local specifically be directed and targeted to the appropriate food item(s) to be heated.

In one embodiment, only one of the compartments of the tray of the packaged food product is provided with a susceptor. However, preferably, at least one of the compartments of the tray is not provided with a susceptor. A further possibility may be that at least one of the compartments of the tray is shielded from microwaves in the solid state microwave oven. This would allow to include a food item into a multi-food item dish which will not be heated in the solid state microwave application. This food item may be for example a salad, a pastry, a dessert, or an ice cream.

Preferably, the packaged food product according to the present invention comprises a food, which comprises one, two, three or even more food items. Thereby, for example, one food item may be a meat product, preferably selected from beef, pork, chicken, lamb or fish, or a meat analogue product. A second food item may be a carbohydrate based food product, preferably selected from potato, pasta, noodle or a cereal product, including rice. A third food item may be a vegetable product, a salad, a dessert or a bakery product.

In one embodiment of the present invention, the packaged food product is frozen or chilled.

A second aspect of the present invention relates to a method for heating a food in a solid state microwave oven comprising the steps of placing the packaged food product according to the present invention into a solid state microwave oven and then heating the food or parts thereof at a selected frequency of between 900 and 5800 MHz. Preferably, the selected frequency is between 900 and 930 MHz or between 2400 and 2500 MHz.

Solid state microwave ovens have a degree of heating process control unavailable with classical magnetron driven microwave ovens. With this additional control and feedback from the heating cavity of the oven, these solid state microwave ovens can determine how much power is reflected back and adapt the heating process accordingly. In some cases, those new ovens can sweep phase and frequency of the applied microwave wavelengths methodically over a wide range and determine the highest return loss modes. This allows then to set frequency and phase in such a way to ensure that the maximum microwave energy is retained within the cavity of the oven, where it is available for an optimal preparation of the food product. Therefore a preferred embodiment of the present invention pertains to a method of the present invention, wherein the selected frequency corresponds to the frequency which results in the highest energy absorption of the susceptor. Thereby, the solid state microwave oven is then preferably operated at a power from 100 to 1600 Watts and for 1 to 30 minutes.

Those skilled in the art will understand that they can freely combine all features of the present invention disclosed herein. In particular, features described for the product of the present invention may be combined with the method of the present invention and vice versa. Further, features described for different embodiments of the present invention may be combined.

Further advantages and features of the present invention are apparent from the figures and examples.

Example 1

Reference Sample Before Microwave Heating.

Figure 1:
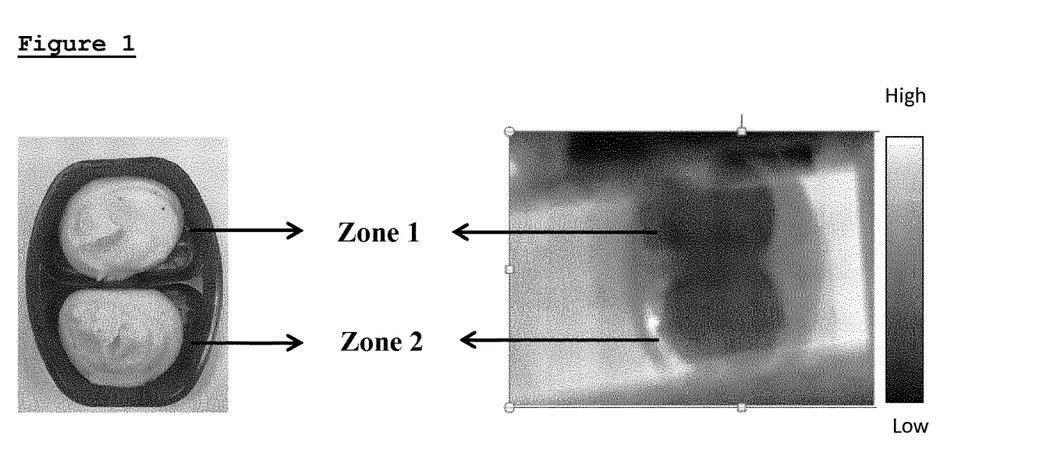
FIG. 1: Two compartment tray and defined zones containing frozen mashed potatoes (left) and infrared image corresponding to the tray indicating temperature from 'Low' to 'High'.

Equal quantities of mashed potato (132 g±2 g) were placed in a two compartment tray and frozen to −18° C. The two compartment tray was a common tray as used commercially for frozen meals. It had a dimension of ca. 18.4 cm to 14.6 cm and a height of ca. 3 cm. It was made of Crystallized Polyethylene terephthalate (CPET) and had a material thickness of 0.5 mm. FIG. 1 shows the nomenclature used for the two zones/compartments of mashed potato and their corresponding infrared images taken using a FLIR Infrared Camera. It can be seen that the mashed potatoes are about equally well frozen in both compartments.

Example 2

Test Samples with a Susceptor Fixed at the Bottom of the Tray in Zone 2.

Figure 2:
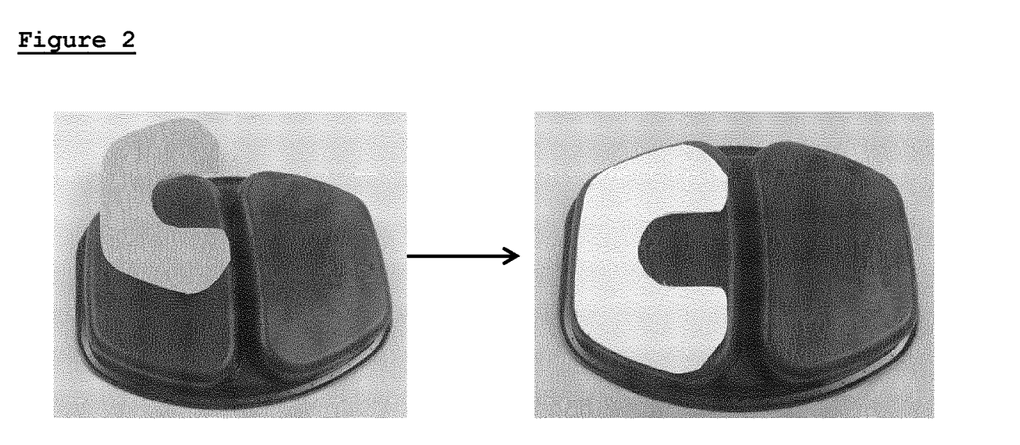
FIG. 2: Illustration of a design of a susceptor (left) and its placement on the outer surface of the bottom of the tray (right).

Susceptors used in this study were of a very thin metal layer applied to the non-food contact side of the film and laminated to a paper based substrate (from Lorence & Pesheck, 2009). Susceptors in certain selected designs were then fixed to the outer bottom at zone 2 of same CPET trays as described in Example (FIG. 2). The susceptors were fixed to the trays in such a way that the metal part of the susceptor faced the surface of the tray.

Figure 3:
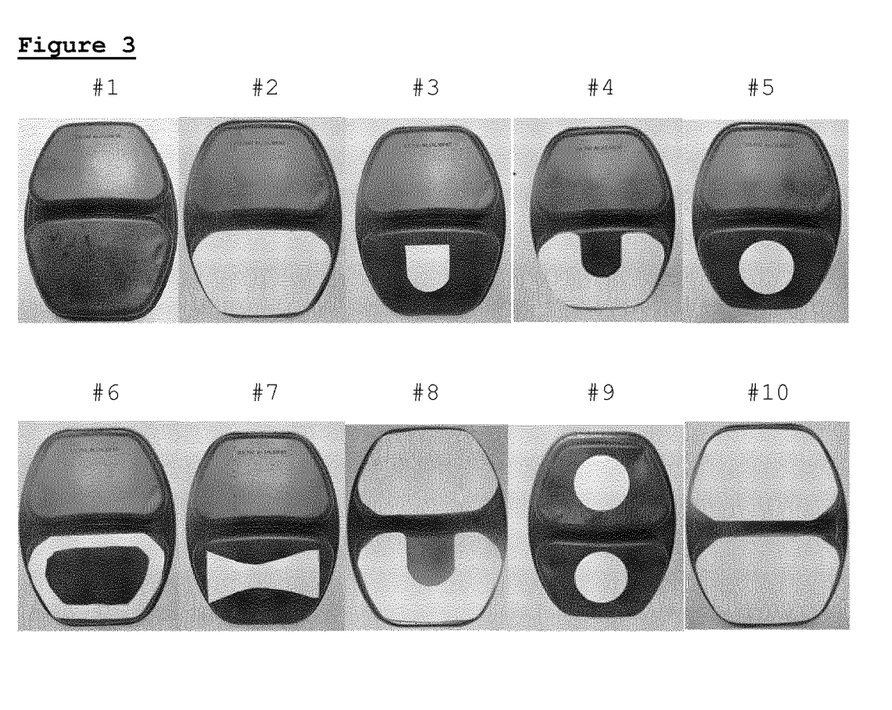
FIG. 3: Samples #1-10 illustrating the different designs and forms of the susceptors attached to the trays tested.
Figure 4:
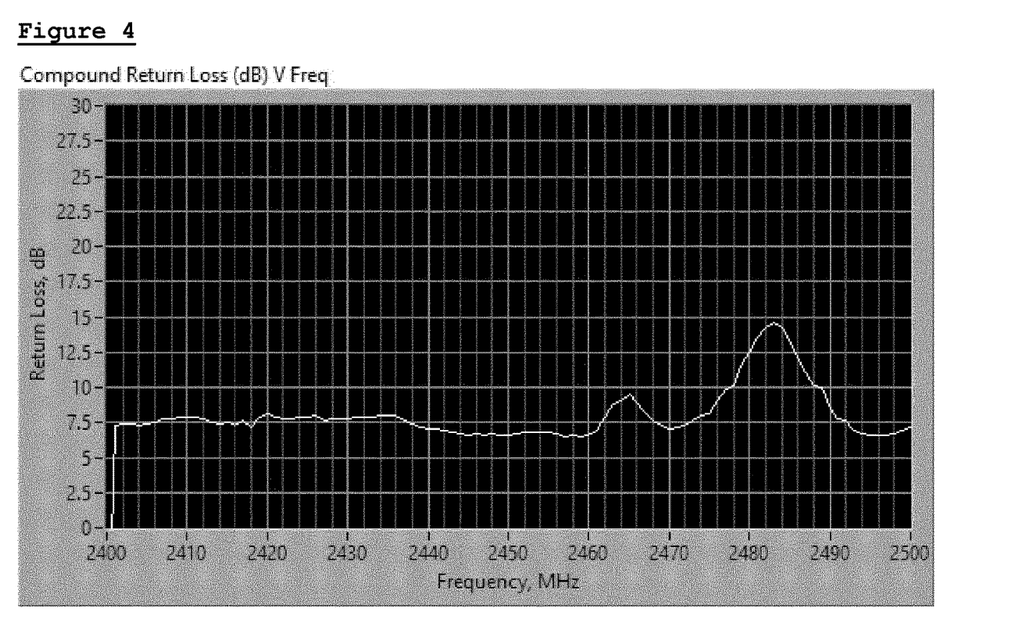
FIG. 4: Plot of a frequency scan measuring energy absorption in a solid state microwave oven.

Different designs and forms of the susceptor as shown in FIG. 3 were used and tested in a solid state microwave oven. For this, each sample tray was filled with mashed potatoes as described in Example 1 and thereafter frozen at −18° C. Thereafter, the samples were put into a solid state microwave oven, where the oven system identified first the frequency with the highest energy absorption, i.e. the highest return loss. One example is shown in FIG. 4 where a highest absorption peak was observed at 2483 MHz. The highest absorption peak is related basically only to the energy absorption by the susceptor as frozen food does not absorb microwave energy well because of its low dielectric loss. The obtained frequency of the absorption peak depends on the susceptor, its form and design, and its ultimate location within the cavity of the microwave oven.

The trays were then heated in a solid state microwave oven operating at the determined frequency with the maximum energy absorption at 500 Watts for 5 minutes. Infrared images were then captured at the end of the heating and the temperatures along the edges and centre of the mashed potatoes placed in the two zones were recorded. The results are shown in the Table II here below.

TABLE II

| Sample Nr. | Peak Freq. [MHz] | Suscept. area *) [%] | Temp. Zone 1 Edge [° C.] | Temp. Zone 1 Centre [° C.] | Temp. Zone 2 Edge [° C.] | Temp. Zone 2 Centre [° C.] |
| --- | --- | --- | --- | --- | --- | --- |
| #1 | 2450 | 0% | 38 | 0 | 53 | 0 |
| #2 | 2423 | 50% | 40 | 10 | 16 | −1 |
| #3 | 2451 | 20% | 61 | 4 | 27 | −1 |
| #4 | 2409 | 30% | 49 | 28 | 20 | 0 |
| #5 | 2417 | 25% | 58 | 9 | 10 | 2 |
| #6 | 2451 | 20% | 60 | 3 | 27 | −1 |
| #7 | 2408 | 30% | 62 | 11 | 33 | 1 |
| #8 | 2471 | 80% | 31 | 2 | 36 | 0 |
| #9 | 2457 | 50% | 62 | 7 | 50 | 1 |
| #10 | 2452 | 100% | 51 | 0 | 62 | 1 |

*) Total bottom area of the tray covered by the susceptor in percent of total bottom surface of the tray.

Sample #1 is a control sample having no susceptor. As can be seen from the results, heating of the food is about identical in both zones (see temperature in Centre). Heating at the edges is pretty inconsistent and variable.

Samples #2-#7 are working examples of the present invention. Particularly when looking at the temperatures in the Centre of the food there is clear evidence that heating in Zone 1, not having the susceptor, is superior to heating in Zone 2, having the susceptor. Temperatures measured at the edges of the food confirm this as well.

Samples #8-#10 are again control examples. Those samples have susceptors in both zones and cover 50% or more of the bottom surface of the tray with susceptor. As can be seen from the results, there is no or much less targeted heating of only one zone. Particularly, the result of #10 (with 100% coverage of susceptor) is very similar to the result of #1, which has no susceptor at all.

Conclusion

Figure 5:
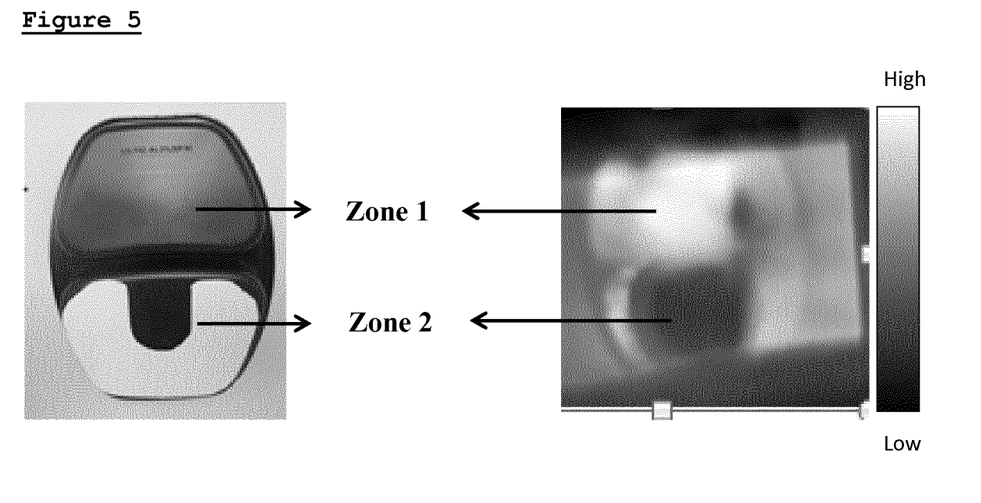
FIG. 5: Two compartment tray according to sample #4 and infrared image corresponding to the tray containing the mashed potatoes after heating in a solid state microwave oven. Temperature scale is indicated from 'Low' to 'High'.
Figure 6:
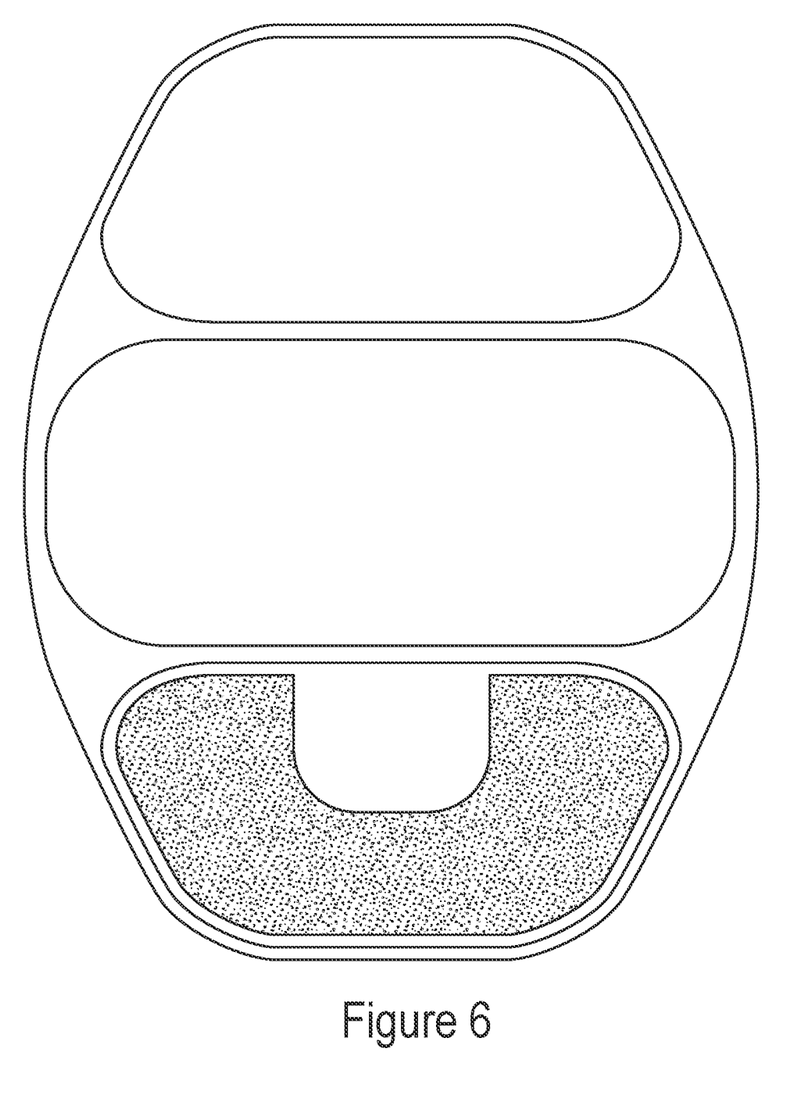
FIG. 6: Illustration of a design of a susceptor attached to a three-compartment tray according to embodiments of the claimed invention.

As shown in the examples presented, the invention allows to specifically target heating to e.g. only one specific compartment of a multi-compartment tray. Particularly sample #4 gave a very good result as also shown in FIG. 5. Hence, it will now be possible with the teaching of the present invention to design new packaged food products which have for example in one compartment a meat item which needs to be cooked very well, and in another compartment a vegetable or salad item which does not need to be heated as much.

Example 3

Further packaged food products of the present invention can be produced with using trays having for example the following thermal resistance value R of the package tray between the susceptor and the food as specified in Table III.

TABLE III

| Type of package tray: | R value of package tray |
| --- | --- |
| CPET Tray + PET film of Susceptor | 0.001232-0.000462 |
| PP Tray + PET film of Susceptor | 0.001316667-0.000594773 |
| Pressed Paper tray + PET film of susceptor | 0.002697102-0.002667935 |
| CPET Tray + Paperboard of Susceptor | 0.00273142-0.001990587 |
| PP Tray + Paperboard of Susceptor | 0.002816087-0.00212336 |
| Pressed Paper Tray + Paperboard of Susceptor | 0.004196522 |

PET films typically used in the prior art on the surface of susceptors to protect for example the food product and/or the susceptor have an R value ranging from 1.75 E-05 to 4.7E-05. This R value is not sufficient to provide thermal insulation as claimed in the present invention.

The invention claimed is:

1. A packaged food product for being heated in a solid state microwave oven, the packaged food product comprising a first food item, a second food item, a tray and a susceptor, wherein the packaged food product is frozen,
    wherein the tray comprises a first compartment for receiving the first food item and provided with the susceptor, and the tray further comprises a second compartment for receiving the second food item and not provided with the susceptor,
    wherein the susceptor is integrated or attached to a bottom of the tray and covers a part of a surface of the bottom of the tray, and the tray comprises a thermal insulation layer between the susceptor and the first food item,
    wherein heating of the food items simultaneously in the tray provides a higher temperature for the second food item positioned in the second compartment of the tray, which is not provided with the susceptor, relative to the first food item positioned in the first compartment, which is provided with the susceptor, and
    wherein the second food item positioned in the second compartment, which is not provided with the susceptor, comprises a meat product, and the first food item positioned in the first compartment, which is provided with the susceptor, is selected from the group consisting of a vegetable product, a pasta, a noodle, a rice product, a potato product, and combinations thereof.

2. The packaged food product according to claim 1, wherein the thermal insulation layer comprises a material selected from the group consisting of plastic material, paperboard, and combinations thereof.

3. The packaged food product according to claim 2, wherein the thermal insulation layer is at least 0.20 mm thick.

4. The packaged food product according to claim 1, wherein the thermal insulation layer has a thermal resistance of at least 0.0004 $m^2K/W$.

5. The packaged food product according to claim 1, wherein the part covered by the susceptor is up to 50% of the surface of the bottom of the tray.

6. The packaged food product according to 1, wherein the part covered by the susceptor is up to 40% of the surface of the bottom of the tray.

7. The packaged food product according to claim 1, wherein the part covered by the susceptor is at least 20% of the surface of the bottom of the tray.

8. The packaged food product according to claim 1, wherein the tray further comprises a third food item and a third compartment for receiving the third food item, wherein the third compartment is shielded from microwaves in the solid state microwave oven, and the third food item is selected from the group consisting of a salad, a pastry, a dessert and an ice cream.

9. The packaged food product according to claim 1, wherein the packaged food product is frozen or chilled.

10. A method for heating a first food item and a second food item in a solid state microwave oven, the method comprising:
 (a) placing a packaged food product in the solid state microwave oven, the packaged food product comprising the first food item, the second food item, a tray and a susceptor, wherein the packaged food product is frozen,
  wherein the tray comprises a first compartment for receiving the first food item and provided with the susceptor, and the tray further comprises a second compartment for receiving the second food item and not provided with the susceptor,
  wherein the susceptor is integrated or attached to a bottom of the tray and covers a part of the surface of the bottom of the tray, and the tray comprises a thermal insulation layer between the susceptor and the first item; and
 (b) heating the first and second food items or parts thereof at a selected frequency between 900 and 5800 MHz,
  wherein the heating of the first and second food items or parts thereof simultaneously in the tray provides a higher temperature for the second food item positioned in the second compartment of the tray, which is not provided with the susceptor, relative to the first food item positioned in the first compartment, which is provided with the susceptor, and
  wherein the second food item positioned in the second compartment, which is not provided with the susceptor, comprises a meat product, and the first food item positioned in the first compartment, which is provided with the susceptor, is selected from the group consisting of a vegetable product, a pasta, a noodle, a rice product, a potato product, and combinations thereof.

11. The method according to claim 10, wherein the selected frequency is between 900 and 930 MHz or between 2400 and 2500 MHz.

12. The method according to claim 10, wherein the selected frequency corresponds to the frequency which results in the highest energy absorption of the susceptor.

13. The method according to claim 10, wherein the solid state microwave oven is operated at a power from 100 to 1600 Watts and for 1 to 30 minutes.

* * * * *